United States Patent [19]

Sapp

[11] Patent Number: 4,611,951
[45] Date of Patent: Sep. 16, 1986

[54] PROCESS FOR RECLAMATION OF EXCAVATED MINE SITES

[75] Inventor: Bobby L. Sapp, Plant City, Fla.

[73] Assignee: American Cyanamid Company, Stamford, Conn.

[21] Appl. No.: 785,296

[22] Filed: Oct. 7, 1985

[51] Int. Cl.⁴ .......................... E02D 3/10; B01D 21/01
[52] U.S. Cl. .................................... 405/128; 210/747; 405/271
[58] Field of Search ................ 405/52, 128, 129, 258, 405/271; 210/710, 714, 747, 169

[56] References Cited

U.S. PATENT DOCUMENTS

| | | | |
|---|---|---|---|
| 3,718,003 | 2/1973 | Cook et al. | 405/129 |
| 3,761,239 | 9/1973 | Cook et al. | 71/33 |
| 3,763,041 | 10/1973 | Cook et al. | 210/714 |
| 3,775,984 | 12/1973 | Livingston | 405/128 |
| 3,940,071 | 2/1976 | Lassiter | 239/524 |
| 4,036,752 | 7/1977 | Lassiter | 210/714 |
| 4,038,183 | 7/1977 | Davidtz | 405/128 X |
| 4,347,140 | 8/1982 | Condolios et al. | 210/710 |

FOREIGN PATENT DOCUMENTS 1052614  11/1983  U.S.S.R. .................. 405/128

Primary Examiner—David H. Corbin
Attorney, Agent, or Firm—Alice C. Brennan

[57] ABSTRACT

An improved process for reclamation of excavated mine sites and otherwise useless land using waste slimes and tailings obtained from the benefication of ore.

7 Claims, 11 Drawing Figures

PROCESS FOR RECLAMATION OF EXCAVATED MINE SITES

BACKGROUND OF THE INVENTION

Surface mining is the primary method for recovering a variety of valuable minerals including: phosphate rock, feldspar, potash, rutile, and titanium from ore deposits. These minerals generally occur in nature in admixture with argillaceous material, silica, and extraneous gangue and are usually covered with as much as twenty to thirty feet of earth, sand, rocks, and vegetation which are referred to as "overburden" by the mining industry.

In order to recover the valuable minerals from the deposit, it has been a conventional practice of the industry to remove the overburden, generally with the aid of draglines, steam shovels or the like, and then using the same or similar equipment to dig the ore from the deposit, casting it into an earthen sump where it is slurried with a stream of high pressure water. Typically, the slurry has been withdrawn from the sump and pumped under high pressure to an ore dressing plant where the slurried matrix is crushed, deslimed, screened and subjected to a flotation process for separation of the valuable minerals from the undesirable constituents of the ore. The undesirable constituents are usually referred to as "slimes" and "tailings" and both have created major disposal problems for the industry since the development of the flotation process in the 1930's. The slimes are aqueous suspensions of ultrafine solid wastes, primarily clay particles, and the tailings are essentially water-insoluble granular particles of sand or quartz.

In the early days, slimes were simply deposited in excavated mining pits or in damned reservoirs where they were permitted to settle and left as lakes in which the bottoms were covered with as much as 20 to 30 feet of unsolidified slimes that never compacted into a solid lake bottom. As such, these lakes were hazardous to anyone who used them. Therefore, in an effort to eliminate such hazardous conditions, water was drained from several of these lakes only to find that a crust formed over the drained slimes, and the slimes beneath the crust never solidify sufficiently to form a stable land mass. For unsuspecting travelers or animals that venture into these drained and crusted areas, this practice created even more hazardous conditions than the lakes with their jelly-like bottoms.

Another problem that has plagued the surface mining industry since the 1930's is the disposal of tailings. Although the disposal of tailings from beneficiation of ore does not produce the hazardous conditions associated with slimes disposal, it has been found that tailings from beneficiation processes are generally devoid of plant nutrients, and use thereof as landfill generally results in production of unstable soil and creation of areas that do not support normal or rapid revegetation.

In an attempt to overcome the above problem and reclaim some of the mined-out properties, several mining operations have employed a reclamation system which is now referred to as lake-land reclamation. In this method of reclamation, portions of the mined out depressions are backfilled with overburden to bring the land back to approximate grade level and the remainder of the depression is converted to a lake. Neither the slimes nor the tailings are utilized in this reclamation system. Rather, in this system the slimes are impounded in reservoirs frequently above ground level and the tailings are simply stackfilled. Water is drained from the settled slimes and then slowly eliminated by ditching around the perimeter of the impounded settled slimes. This system requires continuous attention to proper ditching and immediate repair to the earthen dams which are usually employed to retain the slimes.

As such, there has been a continuing effort over the years to find a satisfactory method for disposing of the waste products obtained from flotation processes and for restoring mined-out properties to a usable condition utilizing the waste products therefrom. However, it was only about a decade ago that significant improvements in the technique of land reclamation began to appear. These improvements constitute the initial entry of the industry into what is now being referred to as "sand-clay" reclamation. They are described in U.S. Pat. Nos. 3,718,003; 3,761,239; 3,763,041; 3,940,071 and 4,036,752, and have been used successfully to restore substantial areas of mined out property to usable condition.

Although these patented processes have met with some success, unfortunately, they are not entirely satisfactory. They have not provided a means for utilizing all of the clay or slimes separated from the ore in the flotation process, nor have they proved to be entirely satisfactory in achieving a recombination of the clay with the sand in a sand-clay ratio approximating the 2:1 ratio found in most Florida phosphate deposits. In practice we have found that the patented processes have generally achieved a sand-clay recombination of only about 5 to 6 parts sand to 1 part clay.

Thus, it is an object of the present invention to provide a novel process for the restoration of mining excavations using sand and clay waste products from an ore flotation process where in the ratio of sand to clay is between about 3:1 to 4:1.

As the demographic pressures of expanding populations continue to increase in the vicinity of surface mining areas, still more effective methods of waste disposal and land reclamation are required to accommodate the needs of the expanding population and to comply with recent county and state environmental regulations. Long-range stability of reclaimed land thus becomes increasingly important since long-range stability is required to restore the uninhabitable, useless land of an excavated mine site to a firmness and fertility which can be utilized for recreation, farming, reforestation and, ultimately, to building sites for housing development. It is to this end that the process of the present invention is directed.

SUMMARY OF THE INVENTION

The present invention relates to an improved process for converting land depressions, either naturally occurring or formed during the surface mining of valuable mineral deposits, into firm, fertile land having excellent bearing strength. The invention also relates to an improved process for the reclamation of excavated mine sites using undesirable waste products, such as slimes and tails, separated from the valuable ore during the hydraulic mining thereof. If further relates to a novel method for (1) inducing rapid settling of slimes, (2) increasing water release rate from slimes or slimes tails mixtures, and (3) providing a more efficient use of the water employed in the hydraulic mining and beneficiation of ore.

While the process of this invention is applicable to a variety of hydraulically-mined ores including: phosphate, potash, feldspar, titanium, and rutile; for the sake of clarity, it will be described in terms of a particular ore processing industry, such as the phosphate industry.

PREFERRED EMBODIMENT OF THE INVENTION

In the process of this invention, reclamation of an excavated mine site or land depression begins with the construction or grading of the area to be restored. For best results, we have found it most efficient to form the land depression into a slimes-settling pond or series of settling ponds that employ the natural contour of the land as an avenue for recovery of the water released from the slimes and tails during the reclamation process.

Overburden, i.e., the soil and rock which generally cover the valuable ore deposit, is used in the construction of dikes across the excavated or depleted mine site. The dikes are raised to the original elevation of the land mass prior to mining, and then used as roadways and support for pipelines necessary for the distribution of sand or tails utilized in the land reconstruction.

Figure 1:
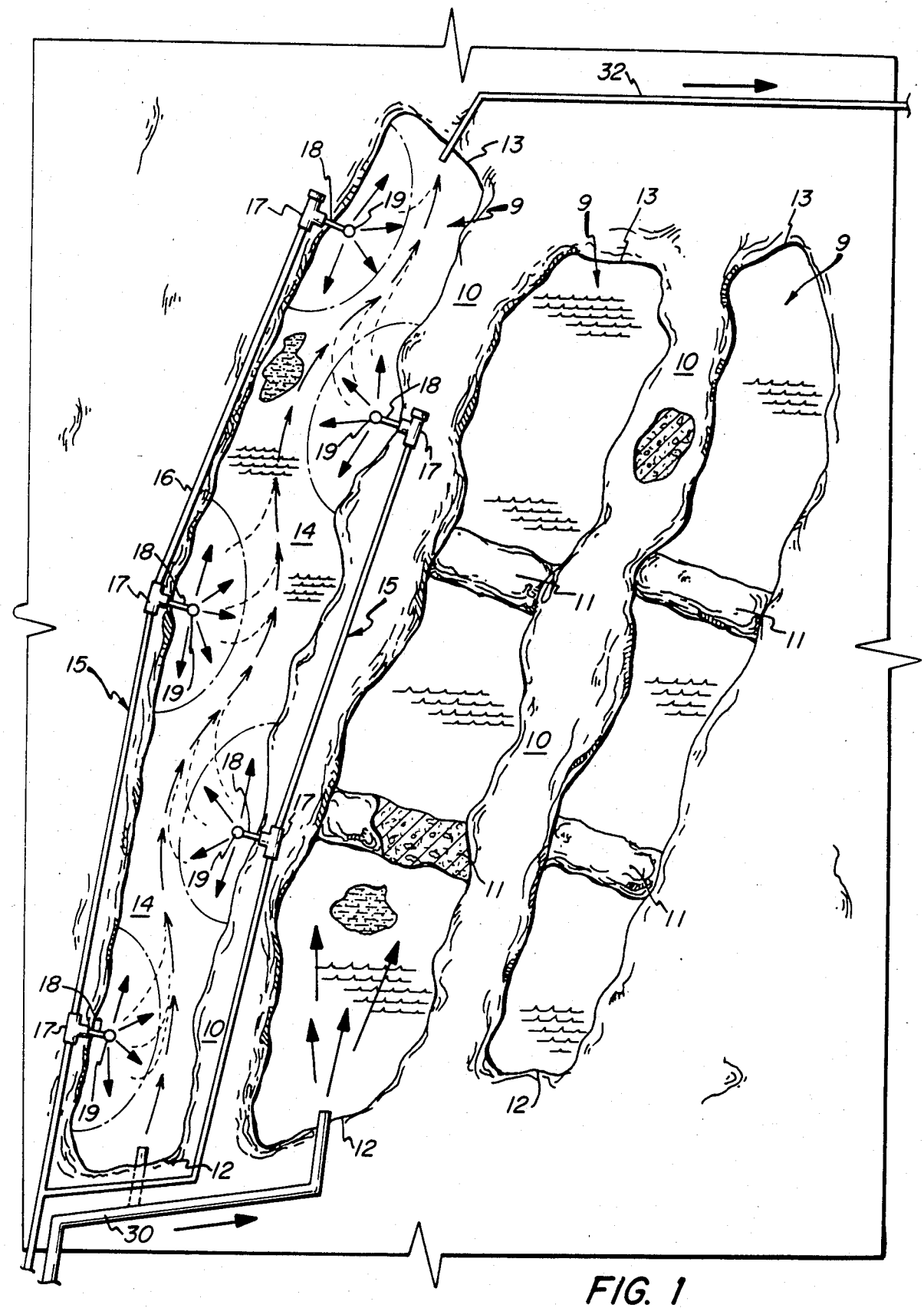
FIG. 1 is a schematic aerial view of the excavated mine site to be reclaimed in accordance with an embodiment of the invention.
Figure 2:
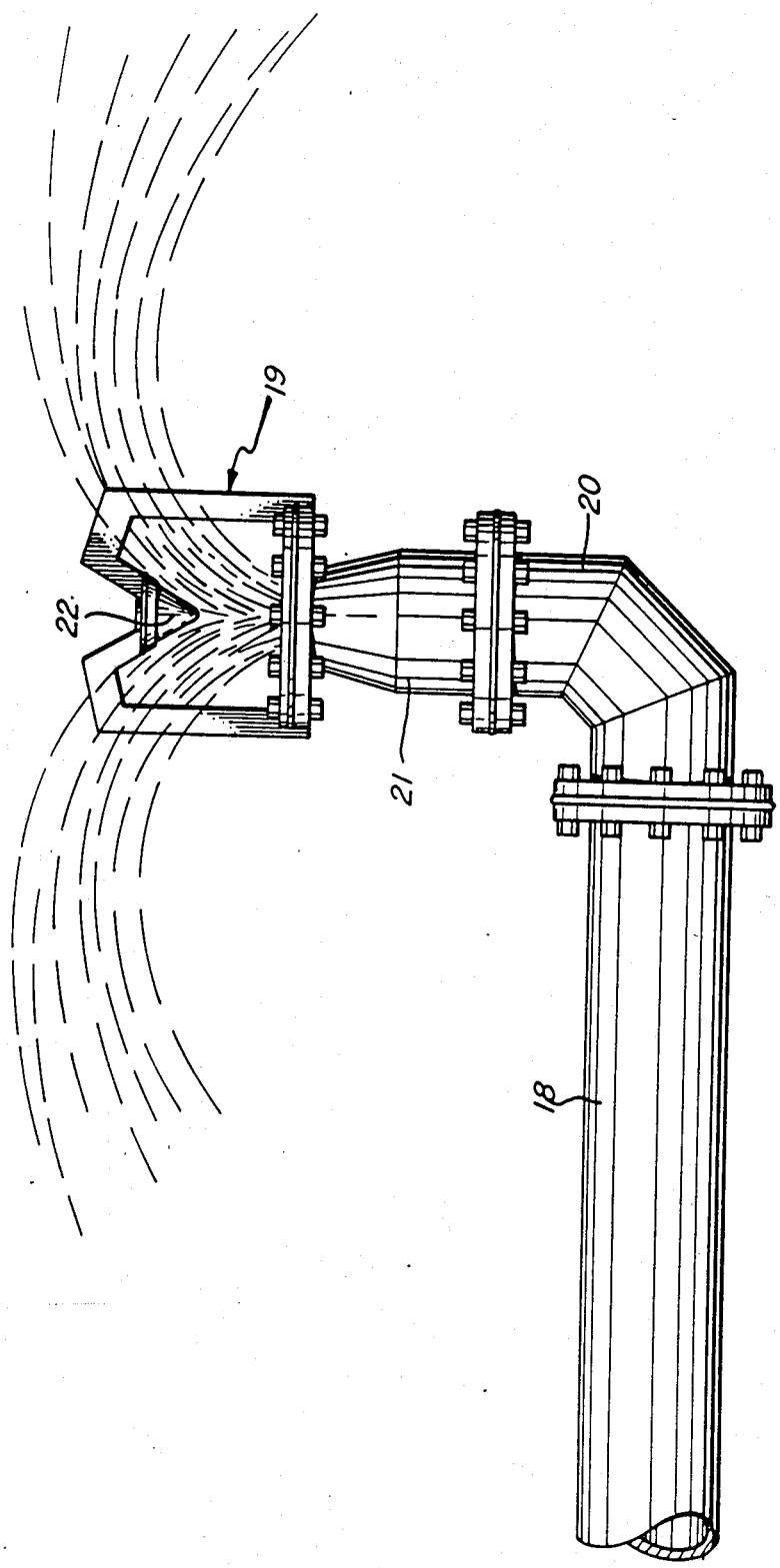
FIG. 2 is a multiple discharge sand spray nozzle.

As shown in FIG. 1, the dikes (10) are constructed such that they form an elongated cut or series of cuts (9) approximately 200 to 250 feet wide, 40 to 60 feet deep, and from about 1,000 to 3,000 feet in length. Low earthen dams (11) are also constructed at intervals, of approximately 500 feet, across the cuts. These dams are constructed to raise about 10 to 20 feet above the floors of the cuts or about one-third the depth thereof and are used to aid in retention and uniform distribution of slimes in the cuts when the introduction thereof is begun.

Overburden is also used in the construction of dams (12 and 13) at both ends of the cuts thereby forming them into elongated slimes-settling ponds of the configuration described above. A weir is provided in the dam (13) at the end of each cut remote from the site of introduction of non-flocculated untreated slimes (30) (frequently referred to as primary clays or slimes), and this weir is employed as a control means for removal of clear water (32) released from the slimes when they have settled.

In practice, the clear water from the settled slimes may be piped or channeled to the ore dressing plant for use in the recovery of the ore product. It may also be used to reslurry and transport deslimed matrix from the primary processing station, adjacent to an active mining pit, to the ore dressing plant.

When construction of a cut has been completed, it is then ready to receive slimes separated from the slurried matrix. In the method of the present invention, the slimes from the slurried matrix may be sent directly to the slimes-settling pond free of flocculating agent; or, in an alternate method of treatment, the slimes may be separated from the matrix, treated with from 0.65 to 1.5 kg, and preferably 0.86 to 1.3 kg of flocculant per ton of slimes, and then sent to the pond for settling. This latter technique provides for rapid release of the water from the slimes and earlier recycle and reuse of the separated water than is achieved when settling is done without the aid of flocculant.

Among the flocculanting agents especially useful in the practice of the present invention are polyacrylamide based flocculants. Particularly effective are anionic polyacrylamides such as those sold by American Cyanamid Company under the trademark ACCO-PHOS ™ 1234, ACCO-PHOS ™ 1250, and ACCO-PHOS ™ 206, or those sold by Hercules Incorporated under the trademark HERCOFLOC ® 1031, or those said by Nalco Chemical Company under the trademark NALCO ® 7873.

In the surface mining of phosphate ores, overburden covering the phosphate rock is removed by any conventional means, as for example, with a dragline or steam shovel. The phosphate-bearing ore comprising about one-third recoverable phosphate, one-third quartz or silica, and one-third of argillaceous material (clay) and extraneous gangue is then dug from the deposit, generally with a dragline, and deposited into an earthen sump where high-pressure water monitors are used to slurry the matrix for pumping. The matrix slurry is transported through a pipeline to a primary processing station located in close proximity to both the active mining site and the land reclamation project. At the primary processing station, plus 3-inch material is separated from the matrix and discarded, preferably in the cut where reclamation is being undertaken. The minus 3-inch plus ¾-inch material is then crushed by a mechanical impactor and mixed with the minus ¾-inch slurried matrix. Thereafter, the slurried matrix is pumped to a hydrocyclone or other conventional hydroseparator where phosphatic clays (slimes) are separated from the matrix solids. The slimes are then pumped directly to the elongated cut, described above, for settling and use in the reclamation of that site; or, alternatively, said slimes may be treated with 0.65 to 1.5 kg of flocculating agent per ton of slimes and then pumped to the settling pond. This latter method of slimes treatment has the important advantage that it significantly enhances the rate at which water is released from the slimes and markedly reduces the settling time necessary to achieve the desired 15% to 25% solids concentration of said slimes.

As used in the present specification, the term "slimes" is intended to mean aqueous suspensions or dispersions of ultrafine solid wastes, such as clays, quartz, and minerals which are generally separated from the ore feed stream prior to flotation treatment. The ultrafine solids usually have a particle size of less than 105 microns, and it is frequently found that as much as 70% to 95% by weight of the slime solids have an average particle size of less than about 40 microns.

As is evident from the above discussion, the term "primary processing station" refers to the treating and transport apparatus located in the vicinity of the active mining site for crushing and screening the matrix solids, separating the slimes and oversize therefrom, and initiating transport of the deslimed matrix solids to the ore dressing plant. This arrangement is especially advantageous when used in conjunction with the present invention since it provides for disposal of waste slimes and undesirable oversized solids with minimum transport requirements. By separating a major portion of the slimes and gangue from the ore matrix at or near the active mining site and disposing of said wastes in the same vicinity, there is achieved a substantial saving in energy costs. This procedure also reduces wear on the pumps and piping used for matrix slurry transport and aids in the rapid separation and recycle of water used in the hydraulic mining operation.

Separation of slimes and oversized wastes at the primary processing station yields a dewatered-deslimed matrix containing about 70% solids. These solids may be discharged directly onto a conveyor belt for transport to the ore dressing plant, as described in U.S. Pat. No. 4,126,275, which is herein incorporated by reference, or they may be discharged into a reslurry tank where they are admixed with water and then pumped as an aqueous matrix slurry to the above-said dressing plant for further treatment.

In practice, it is generally more practical to deposit the deslimed matrix in a reslurry holding tank where it is mixed with water and then pumped to a washer, the first stage of a conventional ore dressing process. The washed matrix is then sized by screening, with the oversized material being crushed and recirculated through the screening system, and the screened product then scrubbed, dewatered, conditioned, and subjected to a flotation treatment where sand tailings are separated from the desired mineral product.

More specifically, at the washer, the deslimed matrix is washed, scrubbed, and screened to produce a clean plus 20-mesh final pebble product which is about 50% of the mine's total phosphate product. The minus 20-mesh material is flotation plant feed and is prepared for flotation in the sizing section. Final preparation of the plant feed provides for removal of tramp plus 20-mesh material and return thereof to the washer and removal of the remaining minus 150-mesh clays (slimes) via bin overflows that report to two 550-feet diameter thickeners. The clay solids are settled in the thickeners with the aid of a flocculant and are then pumped to reslurry tanks where they are combined with the sand tailings for transport thereof to the land reclamation site.

In situations where primary slimes have been permitted to settle without the aid of a flocculant or with a minimum amount of flocculant, it has been found that flocculant can be added at the reslurry tank to the mixture of tails and clay solids from the thickener. The ratio of tails to slimes can be adjusted to about 3:1 to 5:1, and preferably to about 4:1. The amount of flocculant to be added is calculated to provide up to about 1.5 kg of flocculant per ton of slimes. Although the use of flocculant is not required in the process of the present invention, where rapid water release is desired, 0.65 kg to 1.5 kg of flocculant per ton of total slimes can be used in the final reclamation. As indicated above, if desired, the flocculant can be introduced into the primary slimes separated at the primary processing station, or added to the tails-thickner underflow when reslurried at the ore processing plant. Alternatively, the flocculant may be proportioned between both sites of introduction.

Feed to the flotation plant is dewatered to 75% pulp density with 24-inch diameter cyclones, then conditioned with anionic reagents. The conditioned feed flows by gravity to 500-cubic-feet mechanical flotation cells where the sand tailings sink to the bottom of the cells and are removed as waste. The froth (rougher concentrate) is collected for further treatment.

The rougher concentrate is dewatered with cyclones, mixed with water and sulphuric acid, and sent to a series of acid mixers for scrubbing and cleaning to remove the anionic reagent from the surfaces of the feed. From the wash boxes, the second flotation step occurs when cleaner (cationic) float flows by gravity to 500 cubic foot mechanical flotation cells where the sand tailings float and the phosphate sinks. The sand tailings are combined with the waste from the first flotation step and pumped to reslurry tanks where they are combined with the slimes (clay solids) from the thickeners and then pumped to the reclamation site where the sand-slimes mixture is sprayed over the settled slimes in the elongated cut.

Before spraying can be initiated, however, several essential operations must be completed. To begin with, the elongated cut (9), as shown in FIG. 1, which has been constructed and will be reclaimed, must be filled with slimes (14), preferably separated from the matrix at the primary processing station referred to above. In practice, it may take from six months to a year or more to fill the cut depending on the size and capacity thereof. Once filled, the slimes are permitted to settle for a sufficient period of time to obtain a clay solids content between 15% and 20% and preferably between about 15% and 18%.

Clay solids concentration of about 15% to 20% is essential to the present invention since, at a clay solids content in this range, it has been found that sand tailings sprayed over the settled slimes will penetrate said slimes and work down through them like moving fingers causing them to release trapped water along their route of descent.

If the solids content of the consolidated slimes is less than about 15%, sand tailings sprayed over the surface thereof will either penetrate the slimes and sink through to the bottom of the cut or cause them to flow away from the spraying site. In either situation, the slime will not mix with the sand tailings to any desirable degree and will not form the firm, fertile land mass desired.

If the slimes are concentrated to a solids content in excess of about 20%, it has also been found that sand tailings sprayed over the surface thereof can bridge the settled slimes and simply form a jelly-like mass capped with sand tailings.

Thus, in accordance with the present invention, the slimes are permitted to settle in the cut to 15% to 20% solids. Thereafter, the clear water above the settled slimes is drawn off and a multiple discharge spray assembly (15) is installed around the cut. This assembly is used to transport a sand-slimes-flocculant mixture from the ore dressing plant to the reclamation site and to deliver the same to the slime-filled cut in a specified pattern designed to improve mixing and dewatering of the slimes and sand used in the reclamation. Installation of the multiple discharge spray assembly comprises arrangement of a large diameter, i.e., 16-inch–18-inch, conduit system along the top of the dikes on either side of the slime-filled cut. The main lines of this large diameter conduit system are hereinafter referred to as main headers (16). These main headers are equipped with tee assemblies (17) spaced at intervals of several hundred feet along the length of the cut, and said-tee assemblies are arranged in staggered positions on either side of the cut. This arrangement is important since spray header lines (18) are connected to the main headers through the tee assemblies, thus disposing the spray heads that deliver the sand-slime-flocculant mixture in alternating positions on opposite side of the cut along its entire length.

As will be apparent, this spray arrangement is important to the process of the present invention since it provides a serpentine pattern of sand deposition on the settled slimes when spraying is initiated. It is likewise important since it is the sand deposition that provides mixing and heaving of the sand and slimes. This sand-slime movement creates shear forces in the mixture and provides avenues of water release previously not provided by blanket deposition of the sand over the settled slimes.

In the multiple discharge spray assembly of this invention, the spray headers that connect the spray heads (19) with the tee assemblies in the main header are equipped with gate or butterfly valves to control the flow and spraying of the sand-slimes mixture.

The spray headers are generally cantilevered over the settled slimes, but may be floated directly on the settled slimes if desired.

Figure 3A:
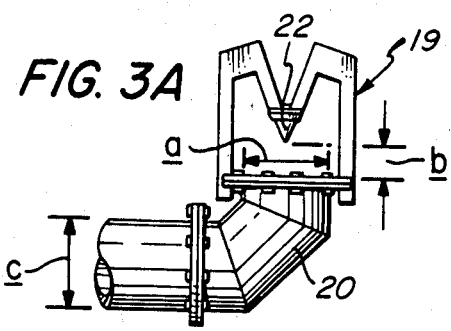
FIG. 3(a) is a multiple discharge spray header assembly without a reducer.
Figure 3B:
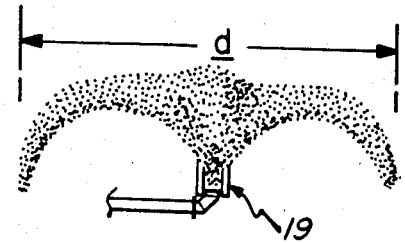
FIG. 3(b) is a spray pattern using the FIG. 3(a) assembly.
Figure 4A:
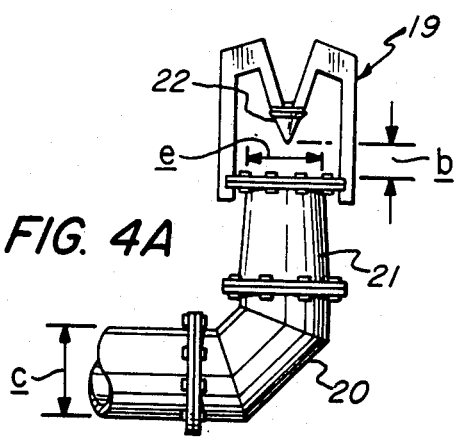
FIG. 4(a) is a multiple discharge spray header assembly with a 16"-14" reducer.
Figure 4B:
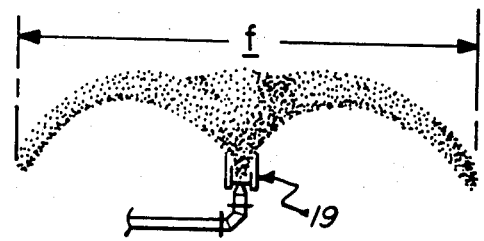
FIG. 4(b) is a spray pattern using the FIG. 4(a) assembly.
Figure 5A:
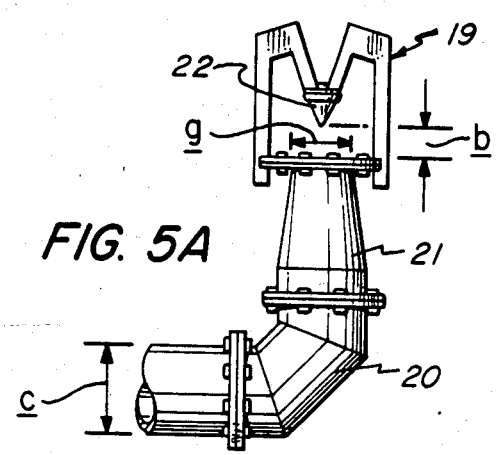
FIG. 5(a) is a multiple discharge spray header assembly with a 16"-12" reducer.
Figure 5B:
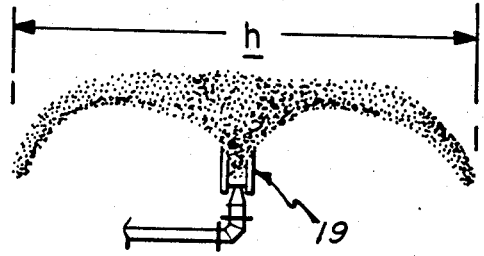
FIG. 5(b) is a spray pattern using the FIG. 5(a) assembly.

As shown in FIGS. 2 to 5, at the farthest extremity of the spray header, there is provided a 45° to 90° elbow (20) arranged to direct the sand-slimes mixture into a stream away from the surface of the settled slimes when the mixture is pumped through the spray system. There is also provided, as shown in FIGS. 3 to 5, a spray-head reducer (21) mounted on the above-said 90° elbow to increase the velocity of the sand-slimes mixture exiting the spray header. Affixed to the spray-head reducer is an inverted transtrix cone (22) located about three to six inches above the exit orifice of the reducer and along the central axis thereof. The transtrix cone is designed to alter the direction of the sand-slimes mixture that impinges upon it during spraying, dispersing it in a relatively uniform circular or umbrella-like pattern having a diameter of approximately 50 feet.

Suitable dimensions for the spray header assembly in FIGS. 3 to 5 are a is 16", b is 3"–6", c is 16", d is 32', e is 14", f is 47', g is 12" and h is 50'.

In practice, it has been found that spray-head reducers that provide a two to four-inch reduction between the 45° to 90° elbow and the exit orifice of the spray-head reducer are eminently suited for use in the process of the present invention.

When the above-described multiple discharge spray assembly is in place, pumping of the sand-slime-flocculant slurry from the reslurry tanks of the ore dressing plant is begun.

Spraying is generally initiated at the spray head or heads located at the top of the cut and most distant from the drainage end thereof. As the sand-clay mixture is sprayed over the settled slimes, the sand particles, which have greater mass than the clay, penetrate said-settled slimes forming minute pores or channels therein as they sink thus releasing water from the settled slimes. Spraying is continued until the settled slimes are virtually saturated with sand, and a sand-slime-flocculant cap of sufficient depth and weight is formed over the sand-saturated slimes to cause them to heave. Development of the cap over the sand-saturated slimes is a major departure from the earlier techniques described in the issued patents referred to above, and is important in the reconstruction of the landfill. In practice, the cap is generally developed to a depth of two to three feet above the sand-saturated slimes although, in some instances, it may be desirable to increase the depth of cap to as much as five feet. The consolidating mass of the cap compresses the material below forcing additional water out of the slimes. It also creates shear forces in the sand-saturated slimes that tend to cause them to heave.

Heaving of the sand-slimes mixture is advantageous in the present process since it provides additional mixing of the sands and slimes and aids in the release of additional water from the slimes. Since the path of least resistance for heaving sand-slime mixtures will generally occur at the interface of the mixture and the untreated slimes in the cut, movement of the mixture will generally be observed along the periphery of the sand-slimes-flocculant spray being deposited.

Referring to FIG. 1, the multiple discharge spray assembly of the present invention produces a sand-slimes spray pattern that creates a serpentine movement of any water released from the settled slimes or any movement of the slimes within the cut. This spray pattern also creates movement of about one-half of the slimes and sand-slimes mixture in the cut against the normal gravitational progression of the slimes and sand-slimes mixture, thus providing better mixing and improved release of water from the mass.

The multiple discharge spray assembly also provides a means for controlling slimes movement which might exceed the rate of movement desired in the cut. This control is achieved by reducing or terminating spraying at the spray head(s) upstream of the slimes movement and initiating spraying from a spray head(s) downstream of the slimes movement.

When the desired depth of cap at a given location in the reclamation site is obtained, spraying at that location is terminated. Heavy equipment such as a caterpiller tractor or bulldozer is then driven back and forth across the cap to induce better dewatering of the slimes and improved mixing of the clay with sand. Equipment operators refer to this practice as "walking the water out of the slime". It has been frequently found that, after this treatment, additional sand or tailings may have to be added to the cap in order to bring the area, in which the water has been walked out of the slimes, back to grade level. It is believed that this treatment is, in part, responsible for improving the sand-clay ratio in the reclamation sites restored by the process of the present invention. The spray head is then moved forward toward the opposite bank of the cut. In this manner, the width of the serpentine channel is continuously diminished until the peripheries of the caps from the several spray heads meet and overlap. It is not uncommon, however, to find that as the peripheries of the caps being developed from alternatively disposed spray heads approach each other, the sand-slimes mixtures which are formed heave to the surface in a serpentine ribbon between the caps. When this occurs, the caps are then worked with bulldozers or other similar equipment to mix the caps with the heaved sand-slimes mixture. If additional overburden is available, it also may be worked into the cap but is not essential for the final grading of the reclamation site since building of the cap with a sand-slimes-flocculant mixture provides a stable, fertile land mass having excellent bearing strength. Additionally, it is noted that the inclusion of clays close to the surface provides dramatic improvement in soil properties involving water retention and phosphorus fertilization which was not available with the earlier method. These clays also improve the quality of the reclaimed surface and thus allow final revegetation to be completed more economically and in a shorter period of time than was required heretofore.

The advantages of the process of the present invention over previous methods of reclamation of excavated mine sites or naturally occurring land depressions include: (1) Complete and exact control of the spray header minimizing the labor requirements by installation of spray headers on adjacent embankment that is solid ground; (2) Significant improvement in the dewatering of clays with 35% clay solids content achieved in approximately one year following reclamation; (3) Reduction in the ratio of sand to clay (slimes) required to produce a firm, fertile land mass of from about 5:1 to 3:1. This (a) improves the quality of the reclaimed mixture plus minimizes the cost per acre of pumping the sand and (b) allows for reclamation to be completed to approximately original contours, as compared to the three to five feet additional height above original grade with previous methods; (4) Twenty-five percent reduction in the time required for reclamation of an excavated site; (5) Improvement in the time required for revegetation of a reclamation site resulting from the addition of secondary clays (slimes) to the sand spray; and (6) control of the sand-to-clay ratio provides a unique opportunity to provide the desired water bearing characteristics of the soils being reconstituted during the reclamation process.

With the process of this invention, it is possible to reclaim land with soils having the water bearing characteristics best suited for wetlands, for various agricultural uses, or for building sites. The process of this invention has been used to reclaim nearly 2,000 acres of mined-out property restoring it to use as grazing land for cattle and citrus orchards.

The present invention is further demonstrated by the examples set forth below.

EXAMPLE 1

Improved process for the reclamation of an excavated mine site using the waste products, slimes, and tailings from hydraulically-mined phosphate ore To evaluate the process of this invention, a mined-out phosphate deposit adjacent to an operating mining pit was selected for restoration to its original topographical configuration.

With the overburden removed from above the phosphate rock when the mine site was active, an elongated cut approximately 200-feet wide, 40- to 60-feet deep, and 2,000-feet long was constructed. Dikes were provided at both ends of the cut, and a weir was installed in the dike having the lowest elevation in the natural contour of the surrounding land. Three low level dikes, 5- to 20-feet high, were also constructed at intervals of about 500-feet across the cut. These dikes were used to inhibit and trap the flow of slimes in the constructed cut. The cut was then filled with untreated primary slimes separated from the matrix at a primary processing station in the immediate vicinity of the active mining pit.

While the slimes were settling in the cut, a multiple discharge spray assembly was installed in the manner described above on the banks of the cut. When the slimes had settled in the cut to 12% to 18% solids, the clear water above the settled slimes was removed and recycled to the ore dressing plant for use in the phosphate flotation cells. The sand tailings from the ore dressing plant were then slurried with secondary slimes, which had been consolidated in the slimes thickener of the ore dressing plant to 3% to 5% solids, and pumped to the reclamation site.

Spraying of the sand-slimes slurry was then begun at the first spray head at the top of the cut and continued until a two- to three-foot cap of sand-slimes and flocculant was developed over the settled slimes. When movement of the slimes along the periphery of the forming cap was observed, spraying was initiated from the spray head on the opposite bank of the cut immediately downstream of the first spray head.

A serpentine flow of water released from the slimes and some movement of slimes along this serpentive path were noted. As filling of the cut progressed, spraying was initiated from spray heads downstream of those spray heads that were already in operation.

Heaving of the slimes and sand-slimes mixture along the peripheries of the developing cap around each of the spray heads was observed, and additional release of water from the heaving mixture was noted.

When the cut was filled and a two- to three-foot cap of sand-slimes was in place over the settled slimes, bulldozers were used to work the heaved sand-slimes mixture into the cap. Available overburden left in spoil piles around the reclamation site was also worked into the cap during final grading of the site. Thereafter, the reclamation site was planted with pine seedlings and revegatation of the area was permitted to take place.

The entire process from construction of the cut to reclamation of the site was accomplished in a three year period.

Six months after reclamation was completed, borings were made throughout the site, and the disposition of sand and clays, total solids, and shear strength were determined. These determinations are reported in Table I below.

TABLE I

Shear Strength vs. Solids Content

| Depth | Shear Strength $S_u$ psf | $S_t \%^1$ | $f \%^2$ | $S \%^3$ | Description |
|---|---|---|---|---|---|
| 34.0 | 245 | 67.7 | 55.7 | 48.1 | Sandy Clay |
| 34.5 | 266 | 56.7 | 59.3 | 43.8 | Sandy Clay |
| 56.5 | 328 | 80.9 | 81.0 | 45.6 | Sandy Clay |
| 57.0 | 287 | 81.6 | 81.2 | 45.5 | Sandy Clay |
| 57.5 | 512 | 75.0 | 63.8 | 52.1 | Sandy Clay |
| 58.0 | 389 | 78.1 | 65.0 | 58.5 | Sandy Clay |
| 29.4 | 205 | 81.7 | 72.0 | 55.6 | Sandy Clay |
| 29.8 | 192 | 78.0 | 71.0 | 50.7 | Sandy Clay |
| 30.0 | 266 | 78.4 | 71.0 | 51.3 | Sandy Clay |
| 30.5 | 238 | 77.4 | 70.9 | 50.0 | Sandy Clay |
|  | 307 | 76.9 | 71.0 | 49.1 | Sandy Clay |
| 31.0 | 203 | 79.0 | 82.7 | 39.4 | Sandy Clay |
|  | 246 | 79.2 | 82.7 | 39.7 | Sandy Clay |
| 41.7 | 389 | 79.1 | 87.5 | 32.1 | Clayey Sand |
| 42.0 | 292 | 65.7 | 29.3 | 57.5 | Sandy Clay |
| 42.5 | 397 | 70.2 | 61.2 | 47.7 | Clayey Sand |
| 43.0 | 418 | 70.5 | 55.0 | 51.8 | Sandy Clay |
|  | 491 | 70.1 | 55.0 | 51.3 | Sandy Clay |
| 43.5 | 439 | 72.8 | 68.4 | 45.8 | Sandy Clay |
|  | 328 | 66.0 | 61.2 | 43.0 | Sandy Clay |
| 29.5 | 307 | 49.0 | 10.8 | 46.1 | Clay |
| 30.0 | 307 | 48.9 | 11.0 | 46.1 | Clay |
| 30.5 | 307 | 49.0 | 10.7 | 46.1 | Clay |

TABLE I-continued

| | Shear Strength vs. Solids Content | | | | |
|---|---|---|---|---|---|
| Depth | Shear Strength $S_u$ psf | $S_t \%^1$ | $f \%^2$ | $S \%^3$ | Description |
| 31.0 | 327 | 49.2 | 11.0 | 46.2 | Clay |

[1]$S_t \%$ = percent total solids
[2]$f \%$ = percent plus 150 mesh sieve
[3]$S \%$ = percent clay solids

EXAMPLE 2

Comparison of reconstituted land fill prepared initially by the Cook et al. process (art) and continued land reconstituted in the same cuts utilizing the novel process of the present invention In the present evaluations, soil samples were obtained using a piston sampler at depth intervals of 5 feet. An airboat was used to move from location to location within each of the cuts. The presence of numerous sand bars along the channel edges made airboat operations difficult. Because of the consistency of the soils at various locations, penetration to the bottom of each cut was not possible. Sampling in Cuts 8B and 8C was not possible because of sand capping which was being done during this time of the field investigation program.

Discussion of Results

Figure 6:
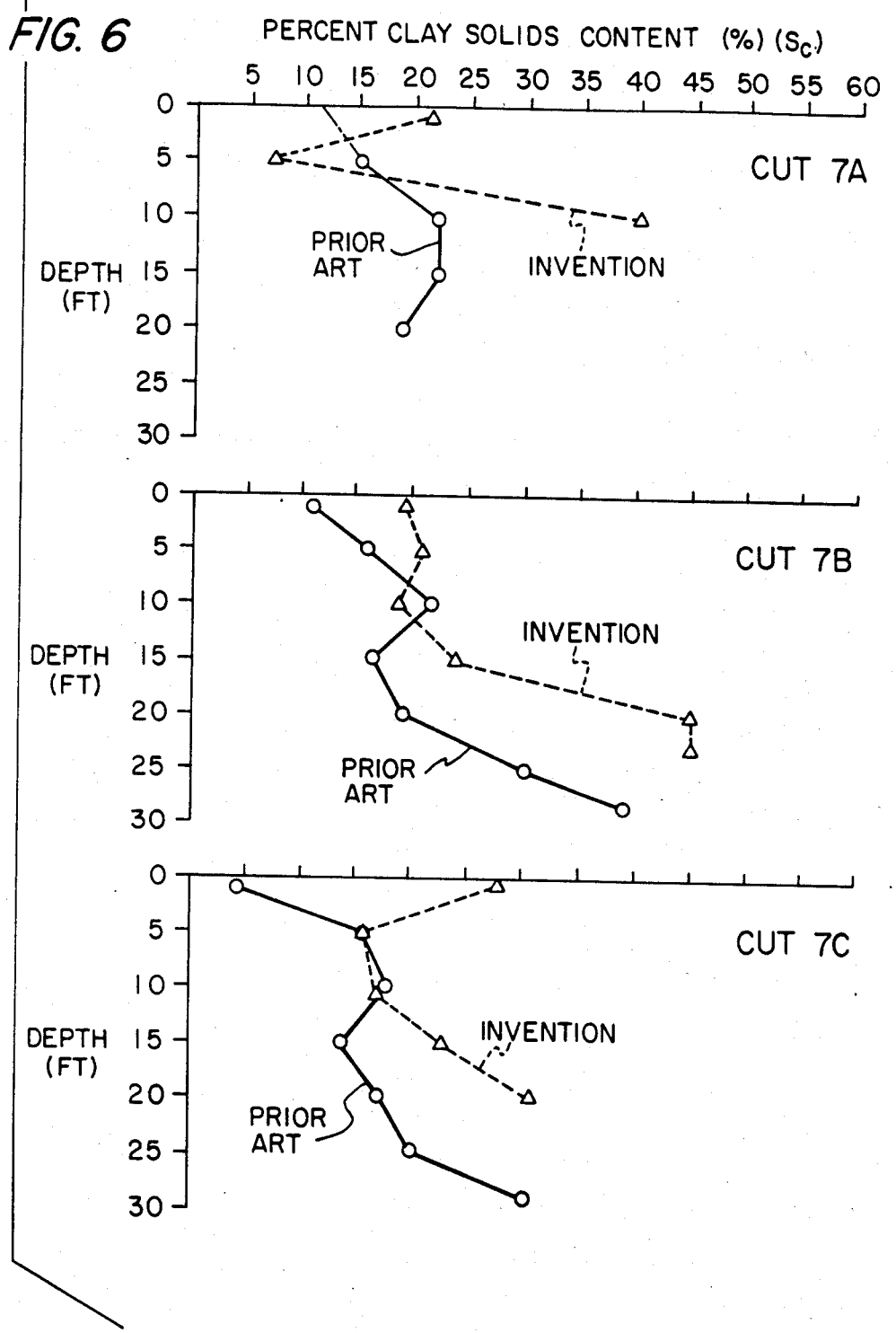
FIG. 6 is a graphic representation of the percent of clay solids content at various depths in elongated cuts 7A, 7B and 7C.
Figure 7:
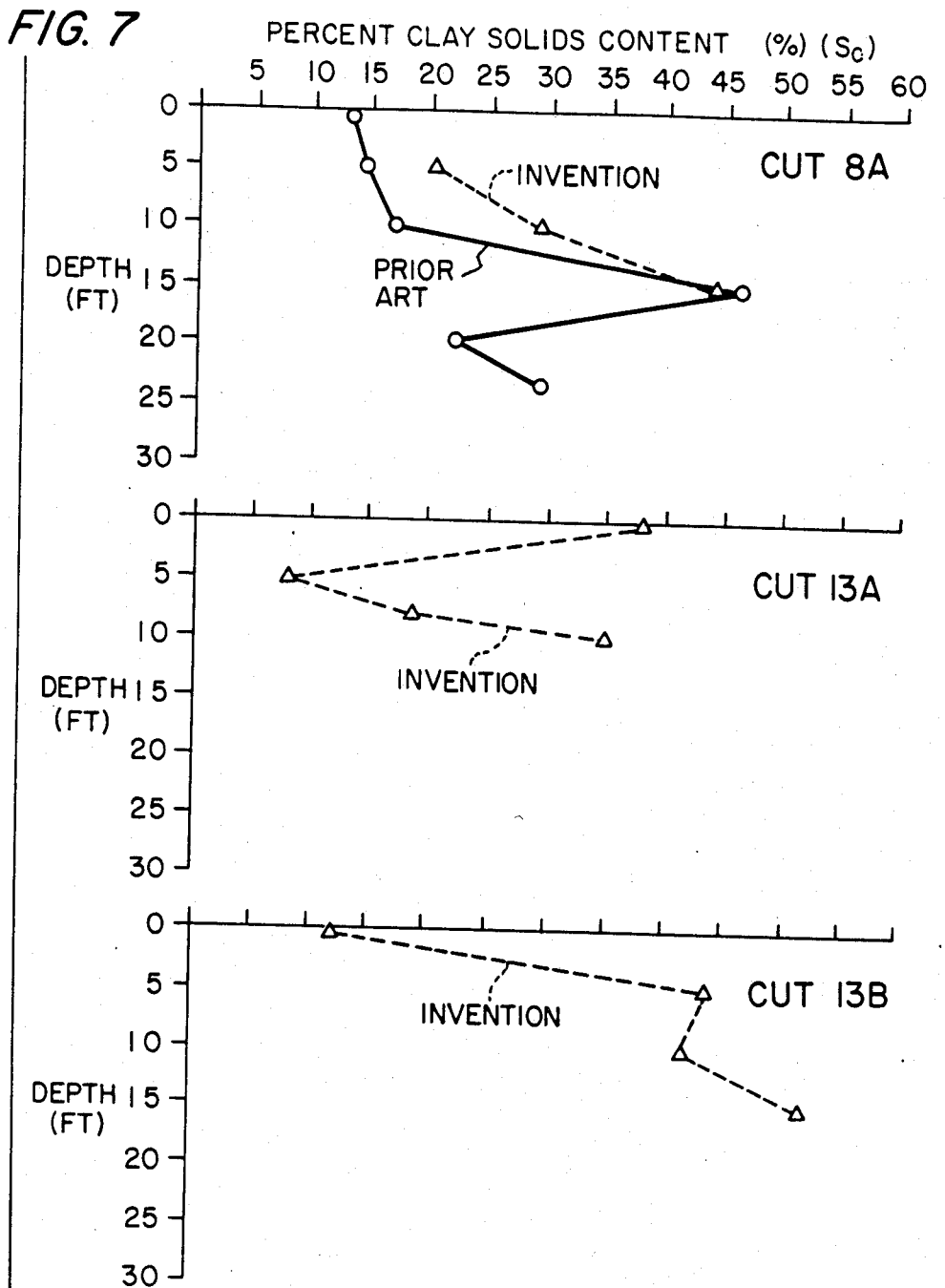
FIG. 7 is a graphic representation of the percent clay solids content at various depths in elongated cuts 8A, 13A and 13B.

The results of this field investigation are presented in Table II and are plotted in FIGS. 6 and 7. The average values shown in Table II and FIGS. 6 and 7 were obtained by using the most representative values of the soil profile for each cut. Some interpretation and engineering judgment were used to obtain these values. The average values for the percent retained on the No. 150 sieve and for the sand-clay ratios were obtained by using the average total solids content values and clay solids content values presented in Table II. The clay solids content distributions shown in FIGS. 6 and 7 were based on a linear interpolation between data points.

In Cut 7A, it appears that a significant amount of sand, on the order of 60%, is present in the upper 10 feet of the soil profile. The average clay solids content was on the order of 30.5%, and the total solids content was on the order of 52%. The average sand-clay ratio value was 1.47. In contrast to Cut 7A, sampling in Cut 7B did not indicate large quantities of sand within the soil profile. On the average, approximately 3% sand was found during the sampling of Cut 7B. The average sand-clay ratio was on the order of 0.03. The average clay solids content was on the order of 27%, and the total solids content was on the order of 28%. In Cut 7C, the surface soils and the soils found below 15 feet indicated a significant amount of sand, on the order of 27%. However, a minimum amount of sand (on the order of 2%) was found at depths of 5 and 10 feet. The average clay solids content was on the order of 23%, and the total solids content was on the order of 29%. The average sand-clay ratio for the soil profile in Cut 7C was on the order of 0.37.

Similar to Cut 7A, Cut 8A indicated large quantities of sand within the soil profile. The percent retained on the No. 150 sieve averaged on the order of 56%. The clay solids content was on the order of 31%, and the total solids content was on the order of 51%. The average sand-clay ratio for Cut 8A was on the order of 1.28. In Cut 13A, the sampling indicated, on the order of 51%, sand within the upper 10 feet of the soil profile. The average clay solids content was on the order of 37%, and the total solids content was on the order of 54%. The average sand-clay ratio was on the order of 1.03. In Cut 13B, approximately 47% of the soil profile was sand. The clay solids content was on the order of 38%, and the total solids content was on the order of 53%. The average sand-clay ratio for the upper 15 feet of Cut 13B was on the order of 0.89. In summary, there appears to be more sand present in Cuts 7A, 8A, 13A, and 13B than in Cuts 7B and 7C.

Comparison of Test Data

The test data found in Table II and FIGS. 6 and 7 are compared with the test data obtained from the same cut while undergoing reclamation by the Cook et al. art process. From a comparison of these data, it appears that within the last two years the average clay solids content has increased on the order of 4%. Moreover, the sand content within the soil profile appears to be greater in the land reclaimed by the present process than the sand content in the soil profile from land reclaimed by the art process.

In Cut 7A, the average clay solids content increased on the order of 10% for land restored by the present process over that restored by the art process. Moreover, the sand content within the soil profile increased from 0% to 60%. This is compatible with an increase of the sand-clay ratio from zero to an average value of 1.47. It is interesting to note that in Cut 7B there was a very insignificant increase in the amount of sand, on the order of 2% of land restored by the art process compared to the present process. In general, the sand-clay ratio value in Cut 7B appears to decrease. However, this normally appears when considering the sand content found below 25 feet in depth. If consideration is given to the sand content below a depth of 25 feet, the sand-clay ratios are as shown in Table I, with an 0.15 sand-clay ratio by the art process and an 0.03 sand-clay ratio by the present process. However, when considering the soil above 25 feet, there is approximately a 2% increase in sand content from the present process over the art process. In Cut 7C, the sand content has increased from 6% to 27% in the soil profile. Although this is not as significant as in Cut 7A, it does indicate an increase in sand-clay ratio from 0.07 to 0.37. The clay solids content in the sand in Cut 7C increased from approximately 19% to 23%. In Cut 8A, the sand content increased on the order of 37% to 56%. This compares to an increase in the sand-clay ratio of 0.59 by the art process to 1.28 by the present process. The clay solids content increased on the average of 26% to 31%. Although there are no data at the present time to compare with the art process data for Cuts 13A and 13B, it appears that the quantity of sand found within the soil profile is similar to that in Cut 7A, on the order of 50%. The average clay solids content values in Cuts 13A and 13B are on the order of 37%, and the sand-clay ratio values are on the order of 0.95.

Observations

After comparing the test data from the field investigation program for the art process with the data obtained for the present process, the following observations are made:

1. The clay solids content has increased on the order of 4% by the present process.

Figure 8:
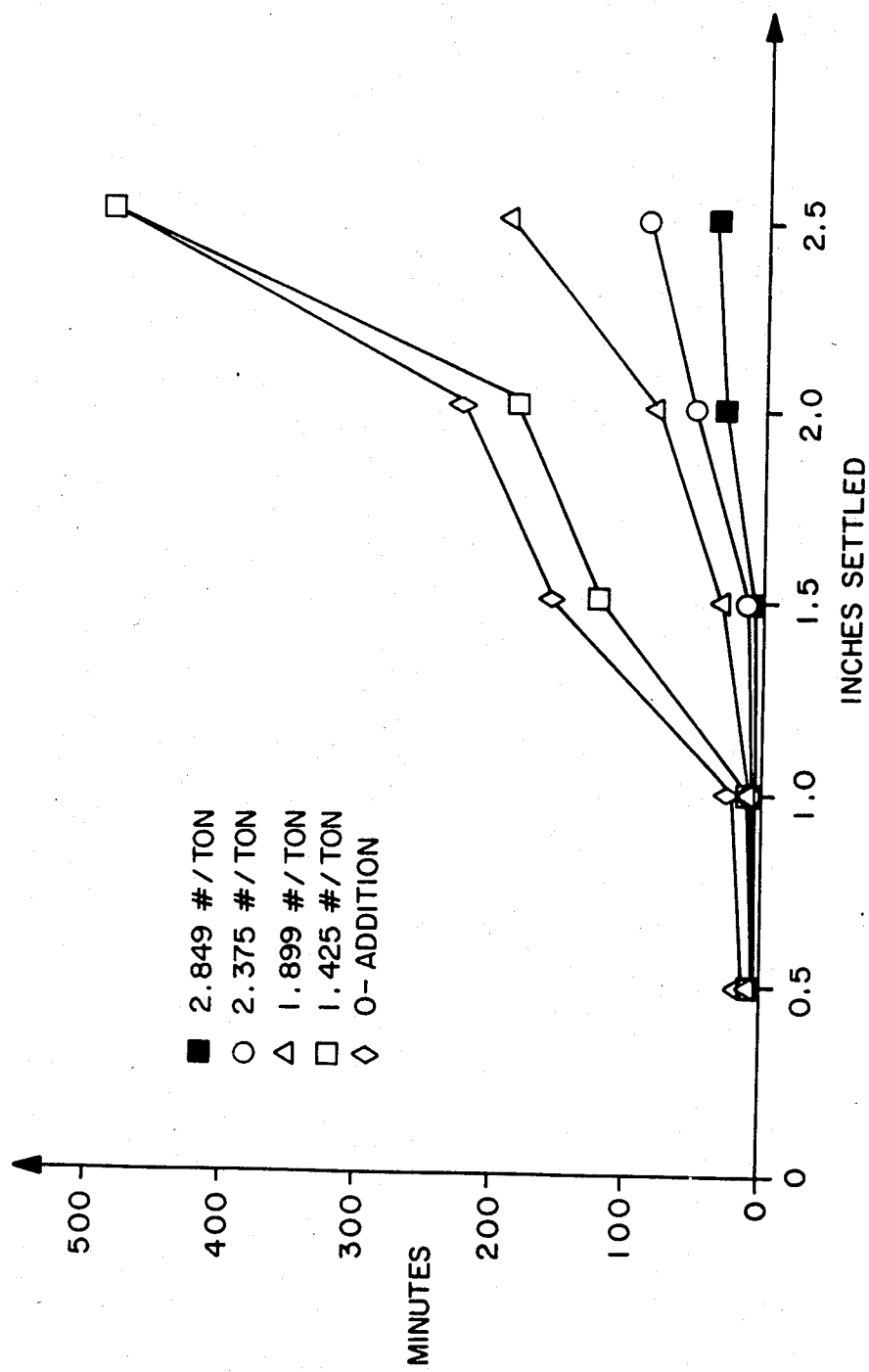
FIG. 8 is a graphic representation of the effect flocculant has on the settling time of sand-clay mixtures.

2. The sand content found within the soil profile of the various cuts has been increased by the present process;

3. In comparing the clay solids content by the present process and the amount of sand contained with the soil profile for the various cuts, data for Cuts 7A, 8A, 13A, and 13B appear to be similar, and data for Cuts 7B and 7C appear to be similar.

gypsum to the mixture has virtually no effect on the settling of sand-clay mixtures. However, addition of from 0.65 kg to 1.29 kg of ACCO-PHOS TM 1234 markedly reduces the settling time of sand-clay mixtures as is demonstrated in FIG. 8.

TABLE II
LABORATORY TEST DATA

| Location | Approximate Depth (Ft) | % Retained No. 150 Sieve Art | % Retained No. 150 Sieve Invention | Sand/Clay Ratio Art | Sand/Clay Ratio Invention | Clay Solids Content (%) Art | Clay Solids Content (%) Invention | Total Solids Content (%) Art | Total Solids Content (%) Invention |
|---|---|---|---|---|---|---|---|---|---|
| Cut 7A | 1.0 | 0 | 16 | — | — | 12.1 | 21.0 | 12.1 | 24.0 |
|  | 5.0 | 0 | 90 | — | — | 15.3 | 7.0 | 15.3 | 44.1 |
|  | 10.0 | 0 | 83 | — | — | 22.4 | 40.0 | 22.4 | 80.0 |
|  | 15.0 | 0 | — | — | — | 22.2 | — | 22.2 | — |
|  | 20.0 | 0 | — | — | — | 19.3 | — | 19.3 | — |
|  |  | Avg. 0 | Avg. 60 | Avg. 0.00 | Avg. 1.47 | Avg. 19.6 | Avg. 30.5 | Avg. 19.6 | Avg. 52.0 |
| Cut 7B | 1.0 | 0 | 3 | — | — | 11.2 | 19.5 | 11.2 | 20.1 |
|  | 5.0 | 0 | 2 | — | — | 16.1 | 21.0 | 16.1 | 20.5 |
|  | 10.0 | 0 | 2 | — | — | 21.7 | 19.0 | 21.7 | 19.3 |
|  | 15.0 | 0 | 2 | — | — | 16.6 | 24.0 | 16.6 | 24.2 |
|  | 20.0 | 0 | 8 | — | — | 19.2 | 45.0 | 19.2 | 46.5 |
|  | 25.0 | 27 | 20* | — | — | 30.1 | 45.0* | 37.2 | 51.0* |
|  | 28.5 | 27 | — | — | — | 39.0 | — | 46.8 | — |
|  |  | Avg. 13 | Avg. 3 | Avg. 0.15 | Avg. 0.03 | Avg. 23.2 | Avg. 27.2 | Avg. 25.8 | Avg. 27.8 |
| Cut 7C | 1.0 | 9 | 16 | — | — | 4.1 | 28.0 | 4.5 | 32.2 |
|  | 5.0 | 2 | 2 | — | — | 15.7 | 16.0 | 16.0 | 16.5 |
|  | 10.0 | 2 | 2 | — | — | 18.0 | 17.0 | 18.3 | 17.2 |
|  | 15.0 | 0 | 41 | — | — | 14.5 | 23.0 | 14.5 | 34.2 |
|  | 20.0 | 2 | 44 | — | — | 17.4 | 31.0 | 17.8 | 45.4 |
|  | 25.0 | 1 | — | — | — | 20.2 | — | 20.4 | — |
|  | 29.0 | 19 | — | — | — | 30.3 | — | 34.9 | — |
|  |  | Avg. 6 | Avg. 27 | Avg. 0.07 | Avg. 0.37 | Avg. 18.6 | Avg. 23.0 | Avg. 19.6 | Avg. 29.1 |
| Cut 8A | 1.0 | 2 | — | — | — | 13.2 | — | 13.5 | 23.1 |
|  | 5.0 | 0 | 37 | — | — | 14.1 | 20.0 | 14.1 | 29.4 |
|  | 10.0 | 0 | 49 | — | — | 16.7 | 29.0 | 16.7 | 43.7 |
|  | 15.0 | 5 | 79 | — | — | 46.3 | 44.0 | 47.5 | 78.6 |
|  | 20.0 | 67 | — | — | — | 22.1 | — | 45.9 | — |
|  | 23.5 | 62 | — | — | — | 29.4 | — | 52.1 | — |
|  |  | Avg. 37 | Avg. 56 | Avg. 0.59 | Avg. 1.28 | Avg. 26.0 | Avg. 31.0 | Avg. 35.9 | Avg. 50.0 |
| Cut 13A | 0.0 |  | 45 |  | — |  | 38.0 |  | 52.7 |
|  | 5.0 |  | 98 |  | — |  | 8.0 |  | 82.1 |
|  | 8.0 |  | 95 |  | — |  | 19.0 |  | 82.1 |
|  | 10.0 |  | 56 |  | — |  | 35.0 |  | 54.8 |
|  |  |  | Avg. 51 |  | Avg. 1.03 |  | Avg. 36.5 |  | Avg. 53. |
| Cut 13B | 0.0 |  | 0 |  | — |  | 12.0 |  | 11.8 |
|  | 5.0 |  | 79 |  | — |  | 44.0 |  | 79.3 |
|  | 10.0 |  | 45 |  | — |  | 42.0 |  | 56.5 |
|  | 15.0 |  | 41 |  | — |  | 52.0 |  | 64.6 |
|  |  |  | Avg. 47 |  | Avg. 0.89 |  | Avg. 37.5 |  | Avg. 53.1 |

*Sampled at a depth of approximately 23 feet

EXAMPLE 3

Modification of sand-clay settling rates adding gypsum and pH modifiers

In these evaluations, a four to one sand-clay mixture is prepared from aqueous primary slimes which are separated from the slurried ore matrix at the primary processing station of hydraulically-mined phosphate ore and from tailings separated from said ore matrix at the processing plant. The thus-prepared mixtures are then divided into 1,000 mL aliquots and treated with flocculant, gypsum, sodium hydroxide or sulfuric acid. The mixtures are then stirred and thereafter permitted to settle. Untreated sand-clay mixtures are used as controls. The samples are watched carefully and times for settling recorded.

The results of these evaluations are presented in Tables III to VI.

Adjustment of the pH from 6.7 to 2.5 increases the time for settling of the clay four fold, and addition of TABLE III
SETTLING TEST OF 4:1 SAND-CLAY MIX
Test 1: Flocculant Addition (ACCO-PHOS TM 1234)

| Slimes Settling, Inches | —O— Addition (Control) | 0.65 kg/ Ton Clay | 0.86 kg/ Ton Clay | 1.08 kg/ Ton Clay | 1.29 kg/ Ton Clay |
|---|---|---|---|---|---|
| .5 | 12.1 | 5.1 | 4.0 | 1.2 | 1.0 |
| 1.0 | 19.0 | 15.0 | 9.4 | 6.6 | 5.2 |
| 1.5 | 150.1 | 120.8 | 28.2 | 10.1 | 7.3 |
| 2.0 | 221.1 | 180.7 | 78.9 | 48.4 | 28.5 |
| 2.5 | 480.0 | 480.0 | 189.8 | 87.3 | 37.3 |

TABLE IV
Test 2: Increase pH (NaOH)

| Slimes Settling, Inches | —O— Addition (Control) | 2.15 kg/ Ton Clay | 3.23 kg/ Ton Clay | 4.31 kg/ Ton Clay | 5.26 kg/ Ton Clay |
|---|---|---|---|---|---|
| .5 | 12.1 | 14.6 | 13.1 | 16.8 | 11.6 |
| 1.0 | 19.0 | 22.2 | 19.8 | 22.4 | 17.2 |
| 1.5 | 150.1 | 148.9 | 149.9 | 151.7 | 142.1 |

TABLE IV-continued

Test 2: Increase pH (NaOH)

| Slimes Settling, Inches | —O— Addition (Control) | Settling time at each level of addition ||||
|---|---|---|---|---|---|
| | | 2.15 kg/ Ton Clay | 3.23 kg/ Ton Clay | 4.31 kg/ Ton Clay | 5.26 kg/ Ton Clay |
| 2.0 | 221.1 | 222.6 | 227.7 | 232.1 | 205.3 |
| 2.5 | 480.0 | 480.0 | 480.0 | 480.0 | 480.0 |
| | pH 6.7 | pH 8.8 | pH 10.2 | pH 12.1 | pH 12.4 |

*Slimes coagulated but settling time was not improved.

TABLE V

Test 3: Decrease pH ($H_2SO_4$)

| Slimes Settling, Inches | —O— Addition (Control) | Settling time at each level of addition ||||
|---|---|---|---|---|---|
| | | 1.08 kg/ Ton Clay | 2.15 kg/ Ton Clay | 3.23 kg/ Ton Clay | 4.30 kg/ Ton Clay |
| 0.5 | 12.1 | 12.6 | 16.6 | 22.6 | 36.1 |
| 1.0 | 19.0 | 18.9 | 22.1 | 67.9 | 88.9 |
| 1.5 | 150.1 | 148.7 | 152.8 | 221.1 | 320.1 |
| 2.0 | 221.1 | 222.6 | 236.9 | 360.8 | 480.0 |
| | pH 6.7 | pH 4.7 | pH 3.5 | pH 3.0 | pH 2.5 |

TABLE VI

Test 4: Addition of Gypsum

| Slimes Settling, Inches | —O— Addition (Control) | Settling time at each level of addition ||||
|---|---|---|---|---|---|
| | | 215 kg/ Ton Clay | 430 kg/ Ton Clay | 646 kg/ Ton Clay | 862 kg/ Ton Clay |
| 0.5 | 12.1 | 14.3 | 12.8 | 16.6 | 16.9 |
| 1.0 | 19.0 | 17.8 | 17.9 | 18.9 | 19.2 |
| 1.5 | 150.1 | 148.8 | 151.1 | 159.7 | 157.1 |
| 2.0 | 221.1 | 220.2 | 224.6 | 232.6 | 222.8 |
| 2.5 | 480.0 | 480.0 | 480.0 | 480.0 | 480.0 |

What is claimed is:

1. A method for disposal of waste slimes and tailings from hydraulically processed surface mined ore and the reclamation of excavated mine sites and land depressions therewith, comprising:
    (a) forming the excavated mine site or land depression into an elongated cut in which the ratio of the length to width thereof is about 5 to 1 to 15 to 1 using overburden to raise the banks of said cut to the original elevation of the land mass before it was mined;
    (b) providing dikes at both ends of the cut of equal elevation level with the top of the side banks of said cut and installing across said cut at intervals throughout its length, low level dikes about one-third of the depth of the cut;
    (c) filling the thus-prepared cut with slimes containing from 0.0 to 1.5 kg of a flocculant/ton of slimes, permitting said slimes to settle to a solids concentration between about 15% and 20% (dry basis) and then draining released water from above the settled slimes;
    (d) mixing sand tailings with an aqueous slimes suspension containing flocculant and about 3% to 5% by weight (dry basis) of ultrafine clay solids;
    (e) pumping the thus-prepared sand-slimes-flocculant mixture to a multiple discharge spray assembly provided along the banks of the slimes-filled cut and initiating spraying of said mixture over the settled slimes from the spray head at the top of the cut;
    (f) continuing spraying of said mixture from said spray head until a cap of about 2 to 3 feet in depth of sand-slimes-flocculant is developed over the settled slimes and some heaving of the sand and slimes along the periphery of the cap is observed;
    (g) reducing or terminating spraying at the spray head when heaving is observed and initiating spraying from the spray head on the opposite bank and immediately down stream of the observed heaving;
    (h) developing caps, as described above, along the extent of the slimes-filled cut thereby producing a sand-slimes pattern in the cut that imparts a serpentine movement to (a) water released from the settled slimes or spray mixture, and (b) to any slimes or sand-slimes mixture which are heaved along the peripheries of the developing caps; and
    (i) advancing the spray heads over the caps toward the opposite banks of the cut until the caps overlap and the sand-slimes-flocculant mixture between the advancing caps heave; and, thereafter working the heaved sand-slimes-flocculant mixture into the cap and then grading the filled cut.

2. A method according to claim 1, wherein the mined ore is phosphate rock.

3. A method according to claim 1, wherein the ratio of the length of the cut to the width thereof is about 10 to 1, and the slimes are settled to from 15% to 18% solids (dry basis) prior to spraying with sand-slimes-flocculant mixture.

4. A method according to claim 1, wherein the concentration of flocculant to slimes is from about 0.65 kg to 1.5 kg of flocculant per ton of total slimes used in reclamation of the excavated mine site.

5. A method according to claim 1, wherein the flocculant is ACCO-PHOS ™ 1234 and is admixed with primary slimes at the primary ore processing station at a concentration of from 0.86 kg to 1.3 kg of flocculant per ton of slimes.

6. A method according to claim 1, wherein sand tailings are admixed with the secondary slimes from the thickener underflow in a sand-to-slimes ratio of about 3:1 to 5:1, and the thus-formed mixture is then treated with from 0.65 kg to 1.3 kg of flocculant per ton of slimes, thereby markedly increasing the settling rate of said sand-slimes mixture.

7. A method according to claim 1, where, after the cap has been developed, spraying of the sand-slimes-flocculant mixture is terminated, heavy equipment is propelled back and forth across the cap until additional water is squeezed from the sand-slimes mixture and spraying of additional sand-slimes-flocculant mixture is applied to the area which has been worked with said heavy equipment.

* * * * *